(12) United States Patent
Jones

(10) Patent No.: US 10,370,114 B2
(45) Date of Patent: Aug. 6, 2019

(54) AIRCRAFT FUEL TANK INERTING SYSTEMS

(71) Applicant: EATON LIMITED, Titchfield (GB)

(72) Inventor: Matthew Darren Jones, Fareham (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 14/775,742

(22) PCT Filed: Mar. 5, 2014

(86) PCT No.: PCT/EP2014/054212
§ 371 (c)(1),
(2) Date: Sep. 14, 2015

(87) PCT Pub. No.: WO2014/139840
PCT Pub. Date: Sep. 18, 2014

(65) Prior Publication Data
US 2016/0039530 A1 Feb. 11, 2016

(30) Foreign Application Priority Data

Mar. 13, 2013 (GB) .................. 1304520.8

(51) Int. Cl.
B64D 37/32 (2006.01)
A62C 3/08 (2006.01)
A62C 99/00 (2010.01)
(52) U.S. Cl.
CPC .............. *B64D 37/32* (2013.01); *A62C 3/08* (2013.01); *A62C 99/0018* (2013.01)

(58) Field of Classification Search
CPC ...................................... B64D 37/32
USPC ...................................... 244/135 R
See application file for complete search history.

(56) References Cited

U.S. PATENT DOCUMENTS

| 3,419,233 A * | 12/1968 | Wotton | B64D 37/14 244/135 R |
| 3,587,618 A * | 6/1971 | Kenyon | B64D 37/32 137/209 |
| 3,669,136 A * | 6/1972 | Parenti | B64D 37/16 137/112 |
| 2003/0116679 A1* | 6/2003 | Susko | B64D 37/32 244/135 R |
| 2003/0218098 A1* | 11/2003 | Goto | B64D 37/08 244/135 R |

(Continued)

FOREIGN PATENT DOCUMENTS

| EP | 2562087 A2 | 2/2013 |
| WO | WO 2011117610 A | 9/2011 |
| WO | WO 2012051252 A1 | 4/2012 |

*Primary Examiner* — Tien Q Dinh
*Assistant Examiner* — Aaron M Rodziwicz
(74) *Attorney, Agent, or Firm* — Leydig, Voit & Mayer, Ltd.

(57) ABSTRACT

An aircraft fuel tank inerting system for a fixed wing aircraft having at least one main fuel tank in the wing and an associated surge tank includes a source of inerting fluid and a flow passage for supplying said inerting fluid to the main fuel tank and discharging it into the main filet tank through at least one discharge outlet. The flow passage includes a pressure relief arrangement adapted to discharge into the surge tank if a pressure in the main fuel tank exceeds a predetermined threshold.

9 Claims, 2 Drawing Sheets

(56) References Cited

U.S. PATENT DOCUMENTS

| | | | | |
|---|---|---|---|---|
| 2004/0262455 | A1* | 12/2004 | Picot | B01D 19/0005 |
| | | | | 244/135 R |
| 2005/0139727 | A1* | 6/2005 | Wozniak | B64D 37/00 |
| | | | | 244/135 C |
| 2008/0001026 | A1* | 1/2008 | Hoffjann | B64D 11/02 |
| | | | | 244/58 |
| 2008/0099079 | A1* | 5/2008 | Johnson | B64C 17/10 |
| | | | | 137/386 |
| 2008/0272237 | A1* | 11/2008 | Tichborne | B64D 37/00 |
| | | | | 244/135 R |
| 2011/0133033 | A1* | 6/2011 | Surawski | B64D 37/32 |
| | | | | 244/129.2 |
| 2012/0193479 | A1* | 8/2012 | Roscoe | B64D 37/08 |
| | | | | 244/135 R |
| 2013/0000142 | A1* | 1/2013 | Tichborne | B01D 53/265 |
| | | | | 34/443 |

* cited by examiner

AIRCRAFT FUEL TANK INERTING SYSTEMS

CROSS REFERENCE TO RELATED APPLICATIONS

This application is a U.S. National Phase application under 35 U.S.C. § 371 of International Application No. PCT/EP2014/054212, filed on Mar. 5, 2014, and claims benefit to British Patent Application No. GB 1304520.8, filed Mar. 13, 2013. The international application was published in English on Sep. 18, 2014, as WO 2014/139840 A1 under PCT Article 21(2).

FIELD

This invention relates to aircraft fuel tank inerting systems for fixed wing aircraft.

BACKGROUND

In fixed wing aircraft, the fuel is usually stored in tanks in the main wing. A typical configuration includes a centre tank and a one or multi-compartmented main tank in each wing. In many configurations it is common to have a surge tank located outboard of, and serving, each main wing tank. The main tanks vent through vent lines into the surge tank. Each surge tank vents to atmosphere through an overboard vent which typically includes a NACA intake designed to maintain a modest pressurisation of the tanks when the aircraft is in flight, but to allow venting when required.

Aircraft fuel tanks are now subject to fuel tank flammability requirements (FAR25.981b). One conventional approach to meeting this requirement is to provide an inerting system in which Nitrogen Enriched Air (NEA) is generated by an On Board Inert Gas Generating System (OBIGGS) which is then pumped into the fuel tanks.

SUMMARY

In an embodiment, an aircraft fuel tank inerting system for a fixed wing aircraft including at least one main fuel tank in the wing and an associated surge tank is provided. The inerting system includes a source of inerting fluid and a flow passage for supplying the inerting fluid to the main fuel tank and discharging it into the main fuel tank through at least one discharge outlet. The flow passage includes a pressure relief arrangement adapted to discharge into the surge tank based on a pressure in the main fuel tank exceeding a predetermined threshold.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Under certain operating conditions, for example when cornering on the ground with a full fuel load, or when the aircraft is subject to negative G, the vent lines from the main tank to the surge tank can become blocked. This creates a potential hazard because, if the inerting system continues to pump NEA into the tanks, there can be a pressure build up within the fuel tanks which loads them beyond their structural limits and possibly driving fuel out of the tanks. In an embodiment, the invention provides an aircraft fuel tank inerting system that can at least reduce this potential hazard.

In an embodiment, the invention provides an aircraft fuel tank inerting system for a winged aircraft including at least one main fuel tank in the wing and an associated surge tank, wherein the inerting system comprises a source of inerting fluid, a flow passage for supplying said inerting fluid to said main fuel tank and discharging it into said main fuel tank through at least one discharge outlet, wherein said flow passage includes a pressure relief arrangement adapted to discharge into said surge tank if the pressure in said main fuel tank and/or said flow passage exceeds a predetermined threshold.

In this way the inerting fluid may be safely vented to atmosphere via the surge tank without over-pressurising the main fuel tanks. The surge tank may typically be disposed outboard and adjacent said main fuel tank, and conveniently include a vent to ambient.

The flow passage may conveniently comprise a duct running through or adjacent the main tank. Thus said flow passage or duct may pass through said main fuel tank into said surge tank and then back into said main fuel tank, with said pressure relief arrangement being disposed in a portion of said flow passage or duct in said surge tank. Said pressure relief arrangement may includes a pressure relief valve in said duct responsive at least in part to the pressure within said duct to open at a predetermined threshold. Alternatively or in addition said pressure relief arrangement may comprise a relief valve disposed in said duct, venting into said surge tank and responsive at least in part to the pressure in the main tank.

In an embodiment, the invention provides a method of inerting an aircraft including at least one main fuel tank in the wing and an associated surge tank, which comprises the steps of: providing a source of inerting fluid, providing a flow passage for supplying said inerting fluid to said main fuel tank and discharging it therein, wherein a pressure relief arrangement is provided to discharge into said surge tank if the pressure in said flow passage and/or said main fuel tank exceeds a predetermined threshold.

Figure 1:
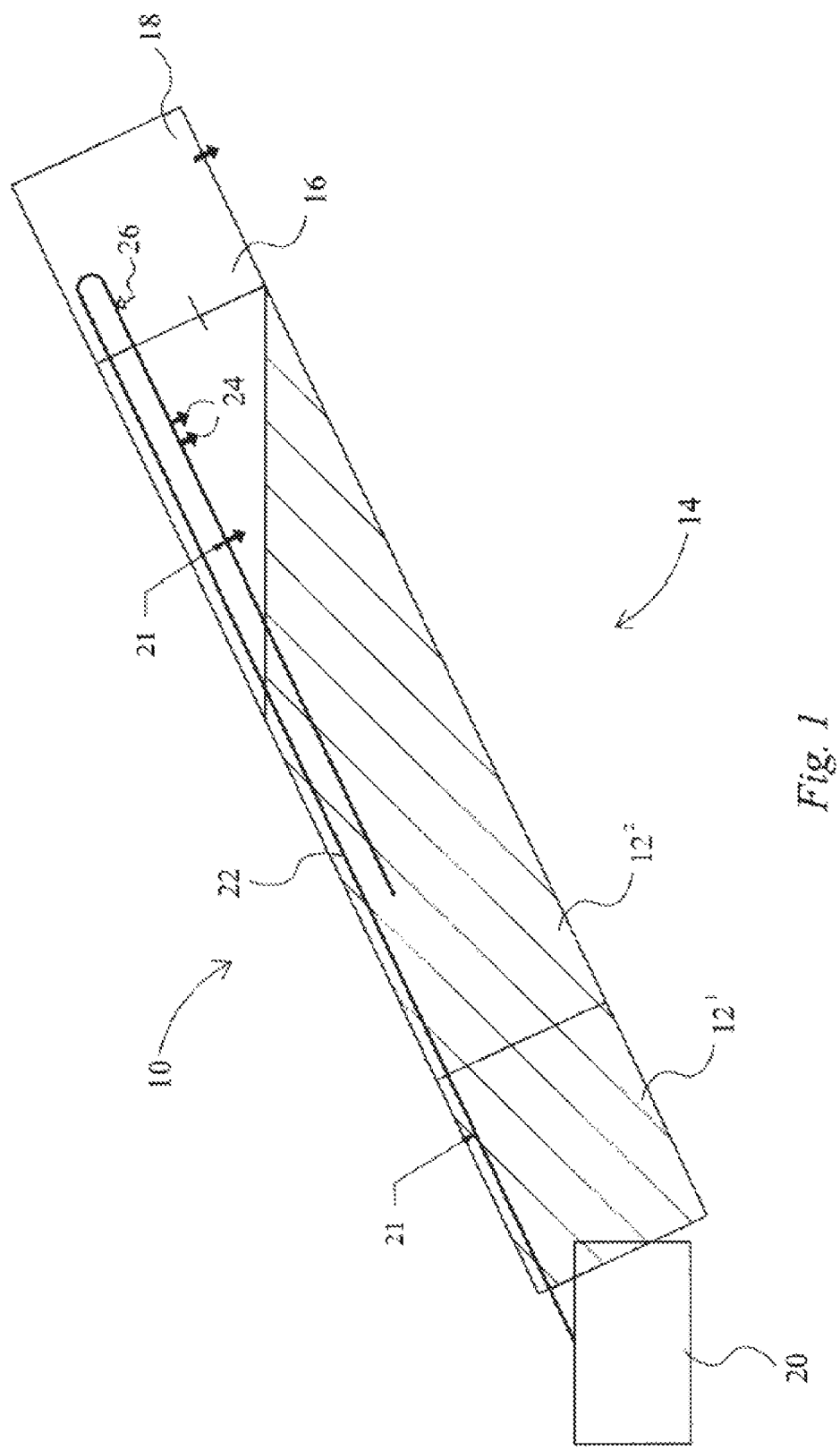
FIG. 1 is a schematic view of a first embodiment of an aircraft fuel tank inerting system in accordance with this invention, and FIGS. 2(a) and (b) are views of a second embodiment of an aircraft fuel tank inerting system in accordance with this invention.

Referring initially to FIG. 1, there is shown schematically one wing 10 of an aircraft within which are provided the inner and outer compartments $12^1$, $12^2$ respectively of a main fuel tank 14. Outboard of the main fuel tank 14, in the wing tip region, is a surge tank 16. Each of the main fuel tanks can vent through vent lines into the surge tank 16. The surge tank 16 has an overboard vent 18 on its underside, through which it may vent to atmosphere. The overboard vent 18 may typically be formed with a NACA inlet to provide a modest pressurisation of the surge tank 16 in flight. An OBIGGS 20 generates nitrogen enriched air (NEA) 21 and delivers it to a duct 22 which passes on an outward limb through the inner and outer compartments $12^1$, $12^2$ of the main tank 14, and into the surge tank 16 before returning back on a return limb into the outer compartment 12² of the main tank 14. The return limb of the duct 22 has a number of outlets 24 through which NEA 21 may discharge into the ullage of the main tank 14, but the outward limb has no discharge outlets.

The NEA 21 provided by the OBIGGS 20 contributes to a low oxygen atmosphere in the ullage to prevent or reduce the risk of explosion. As noted in the introduction, occasionally, the vent lines between the main tanks 12 and 14 and the surge tank 16 may become blocked due to the aircraft undertaking a particular manoeuvre, and if the OBIGGS 20 continues to pump NEA 21 into the ullage the stated problems may arise. In order to address this, the duct 22 carrying the NEA 21 passes through and beyond the main tank 14 and then into the surge tank 16 before it returns to the main tank 14. A pressure relief valve 26 is disposed in a portion of the duct 22 in the surge tank 16. The pressure relief valve 26 is set so that, once there is a predetermined level of back pressure, it opens to discharge the NEA 21 into the surge tank 16 where it can discharge through the output vent 18 to atmosphere.

It will be appreciated that in the above embodiment, the duct 22 delivering NEA 21 to the main tank 14 has a pressure relief valve 26 that discharges into the surge tank 16. The pressure relief valve 26 responds to the pressure in the internal duct 22 at that point to open to discharge into the surge tank 16 when the pressure exceeds a preset limit, which may be fixed or variable.

Figure 2:
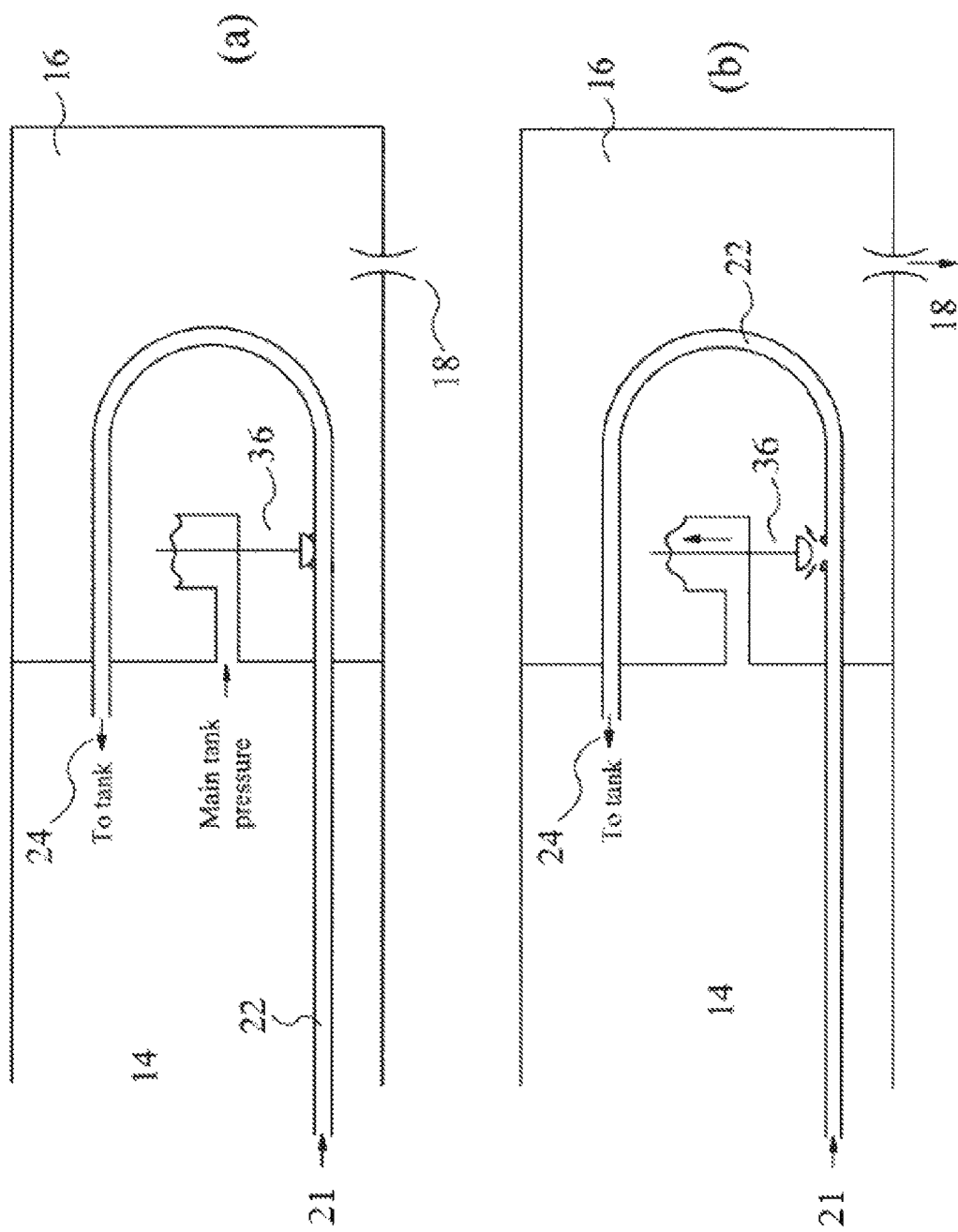

Turning now to FIGS. 2(a) and (b), similar parts will be given similar reference numbers. As previously, NEA 21 from an OBIGGS or other suitable supply 20 is delivered to a duct 22 which passes through the main tank 14, into the surge tank 16 and back into the main tank 14 to discharge through one or more outlets 24. A relief valve 36 is operable to open an aperture in a portion of the duct 22 in the surge tank 16 to allow NEA 21 to pass into the surge tank 16 and then be vented overboard. The relief valve 36 is operated by a bellows arrangement which is exposed on one side to the pressure acting in the main tank 14 and on the other side to a reference pressure (which may be fixed or variable). In this manner, once the main tank pressure has exceeded the reference pressure, the relief valve 36 will open and so the NEA 21 passing along the duct 22 will vent into the surge tank 16 to escape through the vent 18. In addition, depending on the relative pressures, some of the ullage atmosphere may pass back into the outlets 24 of the duct 22 and vent through the relief valve 36.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An aircraft fuel tank inerting system for a fixed wing aircraft including at least one main fuel tank in the wing and an associated surge tank, the inerting system comprising:
   a source of inerting fluid; and
   a flow passage for supplying the inerting fluid to the main fuel tank and discharging it into the main fuel tank through at least one discharge outlet,
   wherein the flow passage includes a pressure relief arrangement adapted to discharge inerting fluid passing along the flow passage into the surge tank based on a pressure in the main fuel tank exceeding a predetermined threshold so that inerting fluid is ventable to atmosphere via the surge tank without over-pressurizing the main fuel tank,
   wherein the flow passage passes through the main fuel tank into the surge tank and then back into the main fuel tank to open into the main fuel tank, and
   wherein the pressure relief arrangement is disposed in a portion of the flow passage in the surge tank.

2. The aircraft fuel tank inerting system according to claim 1, wherein the flow passage includes a duct.

3. The aircraft fuel tank inerting system according to claim 2, wherein the pressure relief arrangement includes a pressure relief valve in the duct responsive at least in part to a pressure within the duct to open at a predetermined threshold.

4. The aircraft fuel tank inerting system according to claim 2, wherein the pressure relief arrangement comprises a relief valve disposed in the duct, the relief valve venting into the surge tank and being responsive, at least in part, to the pressure in the main fuel tank.

5. The aircraft fuel tank inerting system according to claim 1, wherein the surge tank is disposed outboard and adjacent the main fuel tank.

6. The aircraft fuel tank inerting system according to claim 1, wherein the surge tank includes a vent to ambient.

7. The aircraft tank inerting system according to claim 1, further comprising a vent line separate from the flow passage and adapted to vent the main fuel tank into the surge tank.

8. A method of inerting an aircraft including at least one main fuel tank in the wing and an associated surge tank, the method comprising:
   providing a source of inerting fluid,
   providing a flow passage for supplying the inerting fluid to the main fuel tank and discharging it therein, and
   providing a pressure relief arrangement to discharge inerting fluid passing along the flow passage into the surge tank based on a pressure in the main fuel tank and/or the flow passage exceeding a predetermined threshold so that inerting fluid is ventable to atmosphere via the surge tank without over-pressurizing the main fuel tank,
   wherein the flow passage passes through the main fuel tank into the surge tank and then back into the main fuel tank to open into the main fuel tank, and wherein the pressure relief arrangement is disposed in a portion of the flow passage in the surge tank.

9. The method according to claim 8, further comprising providing a vent line separate from the flow passage and adapted to vent the main fuel tank into the surge tank.

* * * * *